(12) United States Patent
Kuramochi et al.

(10) Patent No.: US 12,275,398 B2
(45) Date of Patent: Apr. 15, 2025

(54) VEHICLE DRIVE ASSIST APPARATUS

(71) Applicant: SUBARU CORPORATION, Tokyo (JP)

(72) Inventors: Hiroaki Kuramochi, Tokyo (JP); Shota Yasuda, Tokyo (JP); Shigeki Mukai, Tokyo (JP); Kazuyuki Takahashi, Tokyo (JP); Wataru Munemura, Tokyo (JP); Seiya Sato, Tokyo (JP); Hiroki Maniwa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 194 days.

(21) Appl. No.: 18/067,429

(22) Filed: Dec. 16, 2022

(65) Prior Publication Data

US 2023/0227025 A1 Jul. 20, 2023

(30) Foreign Application Priority Data

Jan. 19, 2022 (JP) .................. 2022-006675

(51) Int. Cl.
*B60W 30/09* (2012.01)
*B60W 30/095* (2012.01)
*B60W 30/12* (2020.01)
*B60W 50/00* (2006.01)

(52) U.S. Cl.
CPC ........ *B60W 30/09* (2013.01); *B60W 30/0956* (2013.01); *B60W 30/12* (2013.01); *B60W 50/0097* (2013.01); *B60W 2420/403* (2013.01); *B60W 2420/408* (2024.01); *B60W 2554/4041* (2020.02)

(58) Field of Classification Search
CPC .. B60W 30/09; B60W 30/0956; B60W 30/12; B60W 50/0097; B60W 2420/403; B60W 2420/408; B60W 2554/4041
USPC ......................................................... 701/301
See application file for complete search history.

(56) References Cited

U.S. PATENT DOCUMENTS

2017/0166204 A1* 6/2017 Yoo .......................... G08G 1/16
2018/0349713 A1* 12/2018 Jiang ...................... G06V 20/58

FOREIGN PATENT DOCUMENTS

| JP | 2017-013678 A | 1/2017 |
| JP | 2018-171959 A | 11/2018 |

* cited by examiner

*Primary Examiner* — Isaac G Smith
(74) *Attorney, Agent, or Firm* — Rimon P.C.

(57) ABSTRACT

A surrounding environment recognition device recognizes a surrounding environment around a vehicle. A traveling control unit centrally controls a whole of the entire vehicle. An obstacle presumer presumes presence of an obstacle ahead of the vehicle based on a behavior distribution of preceding vehicles recognized by the surrounding environment recognition device, and estimates a position and an area where the obstacle is present when the presence of the obstacle is presumed. A traveling path calculator calculates candidates for traveling path areas along which the vehicle is expected to travel while avoiding collision with the presumed obstacle. A traveling path selector selects a traveling path area from among the calculated traveling path areas and sets the selected traveling path area. The traveling control unit controls the vehicle to travel along the set traveling path area.

7 Claims, 7 Drawing Sheets

VEHICLE DRIVE ASSIST APPARATUS

CROSS-REFERENCE TO RELATED APPLICATIONS

The present application claims priority from Japanese Patent Application No. 2022-006675 filed on Jan. 19, 2022, the entire contents of which are hereby incorporated by reference.

BACKGROUND

The disclosure relates to a vehicle drive assist apparatus that performs drive assist control based on surrounding environment information acquired by using an on-board camera device, an on-board radar device, and the like.

In the field of vehicles such as automobiles, autonomous driving control technologies have been developed to cause the vehicles to autonomously travel without driving operations of drivers who drive the vehicles. Various drive assist apparatuses using the autonomous driving control technologies have been proposed and put into practical use to perform various types of traveling control for assisting driving operations of drivers.

Related-art drive assist apparatuses use sensing devices such as an on-board camera device and an on-board radar device as a surrounding environment recognition device that recognizes the surrounding environment around a vehicle and acquires the surrounding environment as surrounding information.

For example, the on-board camera device acquires image data and recognizes, based on the acquired image data, the surrounding environment around the vehicle such as lane lines on a road and various three-dimensional objects on the road (for example, roadside curbstones, guardrails, pedestrians, bicycles, other vehicles, and obstacles that may hinder traveling of the vehicle). The on-board radar device recognizes the various three-dimensional objects (same as above) around the vehicle by outputting radio waves to the surroundings of the vehicle, receiving the reflected radio waves from the objects, and analyzing the received radio waves.

It is known that the related-art drive assist apparatuses have the following control technology. When the vehicle is traveling while recognizing the surrounding environment around the vehicle by using the sensing devices and recognizes, for example, an obstacle that may hinder the traveling of the vehicle on a traveling path of the vehicle, the vehicle continues to travel safely by avoiding collision with the obstacle.

In this control technology, the control to avoid collision with the obstacle is started at a timing of recognition of the obstacle by the sensing devices of the vehicle. Therefore, the vehicle may have less time margin for the avoidance. For example, when a preceding vehicle is traveling immediately ahead of the vehicle, the vehicle may have difficulty in recognizing an obstacle ahead of the preceding vehicle. In this case, the vehicle drive assist apparatus recognizes the obstacle at a later timing. Then, the vehicle may be controlled to, for example, steer or brake suddenly to avoid collision with the target object. Such traveling control may lead to driver's discomfort.

In addition to the normal obstacle avoidance control to be executed in response to direct recognition of an obstacle, the related-art drive assist apparatuses may have various control technologies for avoiding collision with the obstacle based on a behavior of the preceding vehicle as proposed in, for example, Japanese Unexamined Patent Application Publication (JP-A) Nos. 2018-171959 and 2017-13678.

JP-A No. 2018-171959 discloses a drive assist apparatus that detects an obstacle avoidance action of a preceding vehicle early to start an obstacle avoidance action of a vehicle of interest at an earlier timing.

JP-A No. 2017-13678 discloses a drive assist apparatus that avoids collision with an obstacle for a vehicle along the same traveling route as that of a preceding vehicle that has avoided collision with the obstacle.

SUMMARY

An aspect of the disclosure provides a vehicle drive assist apparatus to be applied to a vehicle. The vehicle drive assist apparatus is configured to execute at least lane keeping traveling control for causing the vehicle to travel along a traveling lane and obstacle avoidance control for setting a traveling route to avoid collision with an obstacle on a road and causing the vehicle to travel along the traveling route. The vehicle drive assist apparatus includes a surrounding environment recognition device and a traveling control unit. The surrounding environment recognition device is configured to recognize a surrounding environment around the vehicle. The traveling control unit is configured to centrally control the entire vehicle. The traveling control unit includes an obstacle presumer, a traveling path calculator, and a traveling path selector. The obstacle presumer is configured to presume presence of an obstacle ahead of the vehicle based on a behavior distribution of preceding vehicles recognized by the surrounding environment recognition device, and estimate a position and an area where the obstacle is present when the presence of the obstacle is presumed. The traveling path calculator is configured to calculate candidates for traveling path areas along which the vehicle is expected to travel while avoiding collision with the presumed obstacle. The traveling path selector is configured to select a traveling path area from among the calculated traveling path areas and set the selected traveling path area. The traveling control unit is configured to control traveling of the vehicle along the selected traveling path area.

An aspect of the disclosure provides a vehicle drive assist apparatus to be applied to a vehicle. The vehicle drive assist apparatus is configured to execute at least keeping traveling control for causing the vehicle to travel along a traveling lane and obstacle avoidance control for setting a traveling route to avoid collision with an obstacle on a road and causing the vehicle to travel along the traveling route. The vehicle drive assist apparatus includes circuitry. The circuitry is configured to recognize a surrounding environment around the vehicle. The circuitry is configured to centrally control the entire vehicle. The circuitry is configured to presume presence of an obstacle ahead of the vehicle based on a behavior distribution of preceding vehicles recognized by the detector, and estimate a position and an area where the obstacle is present in a case where the presence of the obstacle is presumed. The circuitry is configured to calculate candidates for traveling path areas along which the vehicle is expected to travel while avoiding collision with the presumed obstacle. The circuitry is configured to select an appropriate traveling path area from among the calculated traveling path areas and set the selected traveling path area. The circuitry is configured to control traveling of the vehicle along the set traveling path area.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

In the related-art drive assist apparatuses disclosed in JP-A Nos. 2018-171959 and 2017-13678, whether an obstacle is present is determined based on the behavior of one preceding vehicle traveling immediately ahead of the vehicle. In this control, it may be difficult to determine, for example, whether the preceding vehicle is avoiding collision with the obstacle or is simply winding. In the related-art control, there is room for improvement to constantly make determination with high reliability.

It is desirable to provide a vehicle drive assist apparatus that can start more accurate obstacle avoidance control at an earlier timing when an obstacle that may hinder traveling of a vehicle is present on its traveling path.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The description of the configuration and operation of this embodiment is directed to a road system of left-hand traffic in which the traveling section of vehicles is a left side in a traveling direction. The configuration of the embodiment of the disclosure is applicable to a road system of right-hand traffic by switching right and left.

Figure 1:
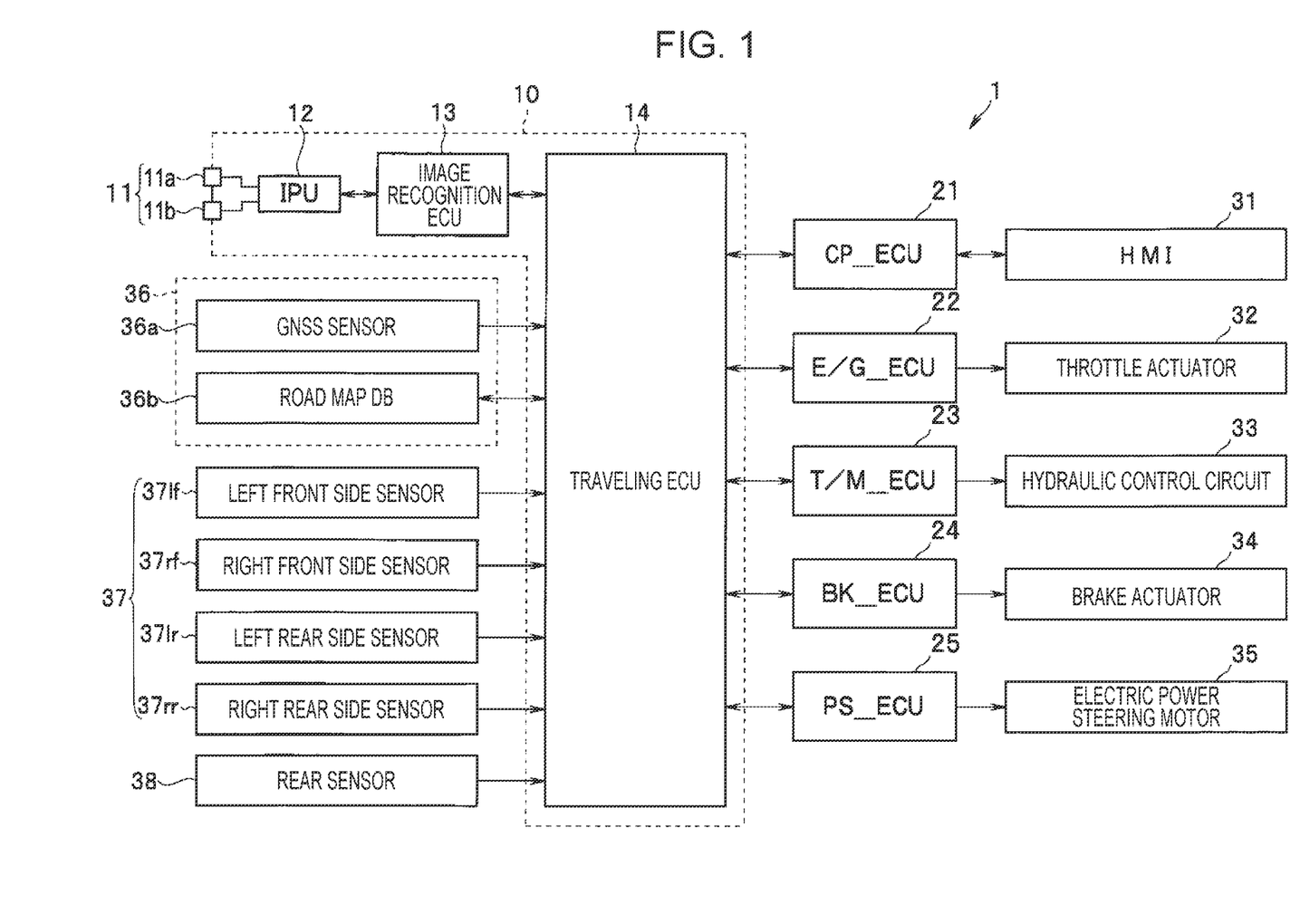
FIG. 1 is a block diagram illustrating a schematic configuration of a drive assist apparatus according to an embodiment of the disclosure.

The schematic configuration of a drive assist apparatus according to the embodiment of the disclosure is described with reference to FIG. 1. FIG. 1 is a block diagram illustrating the schematic configuration of the drive assist apparatus according to the embodiment of the disclosure. As illustrated in FIG. 1, a drive assist apparatus 1 of this embodiment basically has a configuration substantially similar to those of related-art drive assist apparatuses of the same type. Therefore, the following description is overall description of the drive assist apparatus 1 of this embodiment.

The drive assist apparatus 1 of this embodiment includes a camera unit 10 fixed to an upper central part of a front area in a cabin of a vehicle including the drive assist apparatus 1 (hereinafter referred to simply as "vehicle"). In one embodiment, the camera unit 10 may serve as an "on-board camera device".

The camera unit 10 includes a stereo camera 11, an image processing unit (IPU) 12, an image recognition unit (image recognition ECU) 13, and a traveling control unit (traveling ECU) 14.

The stereo camera 11 includes a main camera 11a and a subcamera 11b. For example, the main camera 11a and the subcamera 11b are disposed in the cabin of the vehicle at bilaterally symmetrical positions across the center in a vehicle width direction to face a forward side (in the traveling direction). For example, the main camera 11a and the subcamera 11b each include a CMOS image sensor, and generate a stereoscopic image by acquiring two images of a surrounding environment in an external forward area within a predetermined range from different viewpoints in every predetermined synchronous imaging period.

The IPU 12 performs predetermined image processing for surrounding environment image data obtained by the stereo camera 11 (image data showing the surrounding environment during traveling of the vehicle) to detect edges of various target objects such as objects in the image and lane lines on a road surface. Thus, the IPU 12 recognizes the three-dimensional objects and the lane lines around the vehicle. The IPU 12 acquires distance information from positional deviation amounts of corresponding edges in the right and left images, and generates image information including the distance information (distance image information).

The image recognition ECU 13 obtains, based on the distance image information received from the IPU 12, a road curvature [1/m] between right and left lane lines of a road where the vehicle is traveling (vehicle traveling road) and a width between the right and left lane lines (lane width). Various methods are known to obtain the road curvature and the lane width. For example, the image recognition ECU 13 obtains the road curvature in such a manner that right and left lane lines are recognized by binarization using a difference in brightness levels based on surrounding environment information and the curvatures of the right and left lane lines are obtained for each predetermined section by using a curve approximation expression based on the least-square method. The image recognition ECU 13 calculates the lane width from a difference in the curvatures of the right and left lane lines.

The image recognition ECU 13 calculates, based on the curvatures of the right and left lane lines and the lane width, a lane center and a vehicle lateral position deviation that is a distance from the lane center to the center of the vehicle in the vehicle width direction.

The image recognition ECU 13 performs predetermined pattern matching for the distance image information to recognize three-dimensional objects such as guardrails along the road, curbstones, and surrounding vehicles. In the recognition of three-dimensional objects, the image recognition ECU 13 recognizes, for example, types of the three-dimensional objects, heights of the three-dimensional objects, distances from the three-dimensional objects, speeds of the three-dimensional objects, relative speeds between the three-dimensional objects and the vehicle, and relative distances between the three-dimensional objects (for example, a lateral distance between a roadside curbstone and a lane line nearby).

Various types of information recognized by the image recognition ECU 13 are output to the traveling ECU 14 as first surrounding environment information.

In one embodiment, the image recognition ECU 13 which recognizes the first surrounding environment around the vehicle in cooperation with the stereo camera 11 and the IPU 12 may serve as a "surrounding environment recognition device".

The traveling ECU 14 is a control unit that centrally controls the drive assist apparatus 1. Various control units such as a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are coupled to the traveling ECU 14 via an internal communication network such as a controller area network (CAN).

Various sensors such as a locator unit 36, on-board radar devices 37 (right front side sensor 37rf, left front side sensor 37lf, right rear side sensor 37rr, and left rear side sensor 37lr), and a rear sensor 38 are coupled to the traveling ECU 14.

A human-machine interface (HMI) 31 disposed near a driver's seat is coupled to the CP_ECU 21. For example, the HMI 31 includes a switch for giving instructions to execute various types of drive assist control, a mode selection switch for switching driving modes, a steering touch sensor that detects a steering wheel holding state of a driver, a driver monitoring system (DMS) that performs facial authentication of the driver and detects a line of sight, a touch panel display, a combination of meters, and a loudspeaker.

In response to a control signal from the traveling ECU 14, the CP_ECU 21 notifies the driver as appropriate by display and sound through the HMI 31 about various types of information related to, for example, various alerts for a preceding vehicle, the status of the drive assist control, and the surrounding environment around the vehicle. The CP_ECU 21 outputs, to the traveling ECU 14, various types of information input by the driver through the HMI 31, such as ON/OFF operations on various types of drive assist control.

For example, a throttle actuator 32 of an electronically controlled throttle is coupled to an output side of the E/G_ECU 22. Various sensors such as an accelerator sensor (not illustrated) are coupled to an input side of the E/G_ECU 22.

The E/G_ECU 22 controls drive of the throttle actuator 32 based on, for example, a control signal from the traveling ECU 14 or detection signals from various sensors. Thus, the E/G_ECU 22 adjusts the intake amount of an engine to generate desired engine power. The E/G_ECU 22 outputs, to the traveling ECU 14, signals of an accelerator operation amount and the like detected by various sensors.

A hydraulic control circuit 33 is coupled to an output side of the T/M_ECU 23. Various sensors such as a shift position sensor (not illustrated) are coupled to an input side of the T/M_ECU 23. The T/M_ECU 23 performs hydraulic control for the hydraulic control circuit 33 based on, for example, a signal of an engine torque estimated by the E/G_ECU 22 and detection signals from various sensors. Thus, the T/M_ECU 23 changes the engine power at a desired speed ratio by operating, for example, friction engagement elements and pulleys in an automatic transmission. The T/M_ECU 23 outputs, to the traveling ECU 14, signals of a shift position and the like detected by various sensors.

A brake actuator 34 for adjusting brake fluid pressures to be output to brake wheel cylinders in individual wheels is coupled to an output side of the BK_ECU 24. Various sensors such as a brake pedal sensor, a yaw rate sensor, a longitudinal acceleration sensor, and a vehicle speed sensor (not illustrated) are coupled to an input side of the BK_ECU 24.

The BK_ECU 24 controls drive of the brake actuator 34 based on a control signal from the traveling ECU 14 or detection signals from various sensors. Thus, the BK_ECU 24 generates, for the wheels as appropriate, braking forces for forcible braking control and yaw rate control on the vehicle. The BK_ECU 24 outputs, to the traveling ECU 14, signals of a brake operation status, a yaw rate, a longitudinal acceleration, a vehicle speed, and the like detected by various sensors.

An electric power steering motor 35 for applying a steering torque of a rotational force from a motor to a steering mechanism is coupled to an output side of the PS_ECU 25. Various sensors such as a steering torque sensor and a steering angle sensor are coupled to an input side of the PS_ECU 25.

The PS_ECU 25 controls drive of the electric power steering motor 35 based on a control signal from the traveling ECU 14 or detection signals from various sensors. Thus, the PS_ECU 25 generates the steering torque for the steering mechanism. The PS_ECU 25 outputs, to the traveling ECU 14, signals of a steering torque, a steering angle, and the like detected by various sensors.

The locator unit 36 includes a GNSS sensor 36a and a high-accuracy road map database (road map DB) 36b.

The GNSS sensor 36a measures the position (latitude, longitude, and altitude) of the vehicle by receiving positioning signals from positioning satellites.

The road map DB 36b is a large-capacity storage medium such as an HDD or an SSD, and stores high-accuracy road map information (dynamic map). For example, the road map DB 36b stores lane width data, lane center position coordinate data, lane azimuth angle data, and speed limits as lane data for use in autonomous driving. The stored lane data includes pieces of data for several-meter intervals in each lane on the road map. The road map DB stores information on various facilities and parking lots. Based on, for example, a request signal from the traveling ECU 14, the road map DB 36b outputs road map information in a set range around the vehicle position measured by the GNSS sensor 36a to the traveling ECU 14 as third surrounding environment information.

In one embodiment, the road map DB 36b which recognizes the third surrounding environment around the vehicle in cooperation with the GNSS sensor 36a may serve as a "surrounding environment recognition device".

The right front side sensor 37rf, the left front side sensor 37lf, the right rear side sensor 37rr, and the left rear side sensor 37lr constitute the on-board radar devices 37. For example, the sensors are millimeter wave radars.

Each millimeter wave radar detects a three-dimensional object such as a pedestrian or a vehicle traveling side by side and a structure (three-dimensional object such as a curbstone, a guardrail, a wall of a building, or a plant) along a roadside (for example, an end at a road shoulder) by outputting radio waves and analyzing the reflected radio waves from the objects. Each millimeter wave radar also detects a three-dimensional obstacle on a road. For example, each radar detects a width of the three-dimensional object, a position of a representative point of the three-dimensional object (position and distance relative to the vehicle), and a relative speed as specific information related to the three-dimensional object.

For example, the right front side sensor 37*rf* and the left front side sensor 37*lf* are disposed on right and left sides of a front bumper. The right front side sensor 37*rf* and the left front side sensor 37*lf* detect, as second surrounding environment information, three-dimensional objects in right and left obliquely forward and side areas around the vehicle. Those areas are difficult to recognize from an image captured by the stereo camera 11.

For example, the right rear side sensor 37*rr* and the left rear side sensor 37*lr* are disposed on right and left sides of a rear bumper. The right rear side sensor 37*rr* and the left rear side sensor 37*lr* detect, as the second surrounding environment information, three-dimensional objects in right and left obliquely rearward and side areas around the vehicle. Those areas are difficult to recognize by the right front side sensor 37*rf* and the left front side sensor 371*f*.

In one embodiment, the on-board radar devices 37 (right front side sensor 37*rf*, left front side sensor 37*lf*, right rear side sensor 37*rr*, and left rear side sensor 371*r*) which recognize the second surrounding environment around the vehicle may serve as a "surrounding environment recognition device" . . . . The pieces of information acquired by the sensors 37*rf*, 371*f*, 37*rr*, and 37*lr* are sent to the image recognition ECU 13.

Examples of the rear sensor 38 include a sonar device. For example, the rear sensor 38 is disposed on the rear bumper. The rear sensor 38 detects three-dimensional objects in a rearward area behind the vehicle as fourth surrounding environment information. This area is difficult to recognize by the right rear side sensor 37*rr* and the left rear side sensor 371*r*.

In one embodiment, the rear sensor 38 which recognizes the fourth surrounding environment around the vehicle may serve as a "surrounding environment recognition device".

Coordinates of the external targets in the first surrounding environment information recognized by the image recognition ECU 13, the third surrounding environment information recognized by the locator unit 36, the second surrounding environment information recognized by the on-board radar devices 37 (right front side sensor 37*rf*, left front side sensor 37*lf*, right rear side sensor 37*rr*, and left rear side sensor 371*r*), and the fourth surrounding environment information recognized by the rear sensor 38 are converted by the traveling ECU 14 into coordinates in a three-dimensional coordinate system having its origin at the center of the vehicle.

The traveling ECU 14 has driving modes such as a manual driving mode, a first traveling control mode, a second traveling control mode, and a limp home mode. The traveling ECU 14 can selectively switch the driving modes based on, for example, a status of operation on the mode selection switch of the HMI 31.

The manual driving mode is a driving mode in which the driver is assumed to hold the steering wheel. In this driving mode, the vehicle travels by driving operations of the driver, such as a steering operation, an accelerator operation, and a brake operation.

The first traveling control mode is also a driving mode in which the driver is assumed to hold the steering wheel. That is, the first traveling control mode is a so-called semi-autonomous driving mode or drive assist mode in which the vehicle travels along a target traveling route by combining, for example, adaptive cruise control (ACC), active lane keep centering (ALKC) control, and active lane keep bouncing control as appropriate through control of, for example, the E/G_ECU 22, the BK_ECU 24, and the PS_ECU 25 while reflecting the driving operations of the driver.

The adaptive cruise control (ACC) is basically performed based on the first surrounding environment information input from the image recognition ECU 13. For example, the adaptive cruise control (ACC) is performed based on preceding vehicle information in the first surrounding environment information from the image recognition ECU 13.

The active lane keep centering control and the active lane keep bouncing control are basically performed based on the first surrounding environment information and the third surrounding environment information input from one or more of the image recognition ECU 13 and the locator unit 36. For example, the active lane keep centering control and the active lane keep bouncing control are performed based on lane line information in the third surrounding environment information from the image recognition ECU 13 or the locator unit 36.

The second traveling control mode is an autonomous driving mode that realizes a so-called hands-off function in which the vehicle travels along a target route (route map information) by combining, for example, the adaptive cruise control, the active lane keep centering control, and the active lane keep bouncing control as appropriate through control of, for example, the E/G_ECU 22, the BK_ECU 24, and the PS_ECU 25 without the steering wheel holding by the driver, the accelerator operation, and the brake operation.

In the limp home mode, the vehicle is automatically stopped, for example, at a side strip when the vehicle traveling in the second traveling control mode cannot continue the traveling in this mode and the driver cannot take over the driving operation (that is, the mode cannot be switched to the manual driving mode or the first traveling control mode).

In each of the driving modes described above, the traveling ECU 14 executes obstacle avoidance control involving autonomous emergency braking (AEB: collision damage reduction braking) control and emergency steering control as appropriate in response to recognition of a three-dimensional obstacle such as a preceding vehicle or a fallen object on a vehicle traveling road with a strong possibility of colliding with the vehicle.

All or part of the locator unit 36, the image recognition ECU 13, the traveling ECU 14, the CP_ECU 21, the E/G_ECU 22, the T/M_ECU 23, the BK_ECU 24, and the PS_ECU 25 are/is a processor including hardware.

For example, the processor is constituted by known components and their peripheral devices including a central processing unit (CPU), a random access memory (RAM), a read only memory (ROM), a non-volatile memory, a non-volatile storage, and a non-transitory computer readable medium.

The ROM, the non-volatile memory, and the non-volatile storage prestore software programs to be executed by the CPU and fixed data such as data tables. The CPU reads the software programs stored in the ROM and the like and executes the software programs by loading the software programs in the RAM. The software programs implement the functions of the components and units (13, 14, 21 to 25, 36) by referring to various types of data as appropriate.

The processor may be implemented by a semiconductor chip such as a field programmable gate array (FPGA). The components and units (13, 14, 21 to 25, 36) may be implemented by electronic circuits.

The software programs may entirely or partly be recorded as computer program products in a non-transitory computer readable medium such as a portable sheet medium typified by a flexible disk, a CD-ROM, or a DVD-ROM, a card memory, a hard disk drive (HDD), or a solid state drive (SSD).

Operations of the drive assist apparatus 1 of this embodiment are described with reference to FIG. 2 to FIG. 6.

The drive assist apparatus 1 of this embodiment has a function of assisting driving operations of the driver by executing, for example, the adaptive cruise control (ACC), the active lane keep centering (ALKC) control, and the active lane keep bouncing (ALKB) control. The drive assist apparatus 1 of this embodiment also has a function of assisting the driving by executing the obstacle avoidance control in response to recognition of an obstacle on a traveling road.

The drive assist apparatus 1 of this embodiment has the following function. Even if the vehicle including the drive assist apparatus 1 cannot directly recognize an obstacle ahead of the vehicle traveling along a traveling path on a road in the drive assist mode, the drive assist apparatus 1 recognizes behaviors of preceding vehicles to presume the presence or absence of the obstacle ahead on the traveling path and its position and size (obstacle presence area), thereby executing the obstacle avoidance control prior to the direct recognition of the obstacle.

Figure 2:
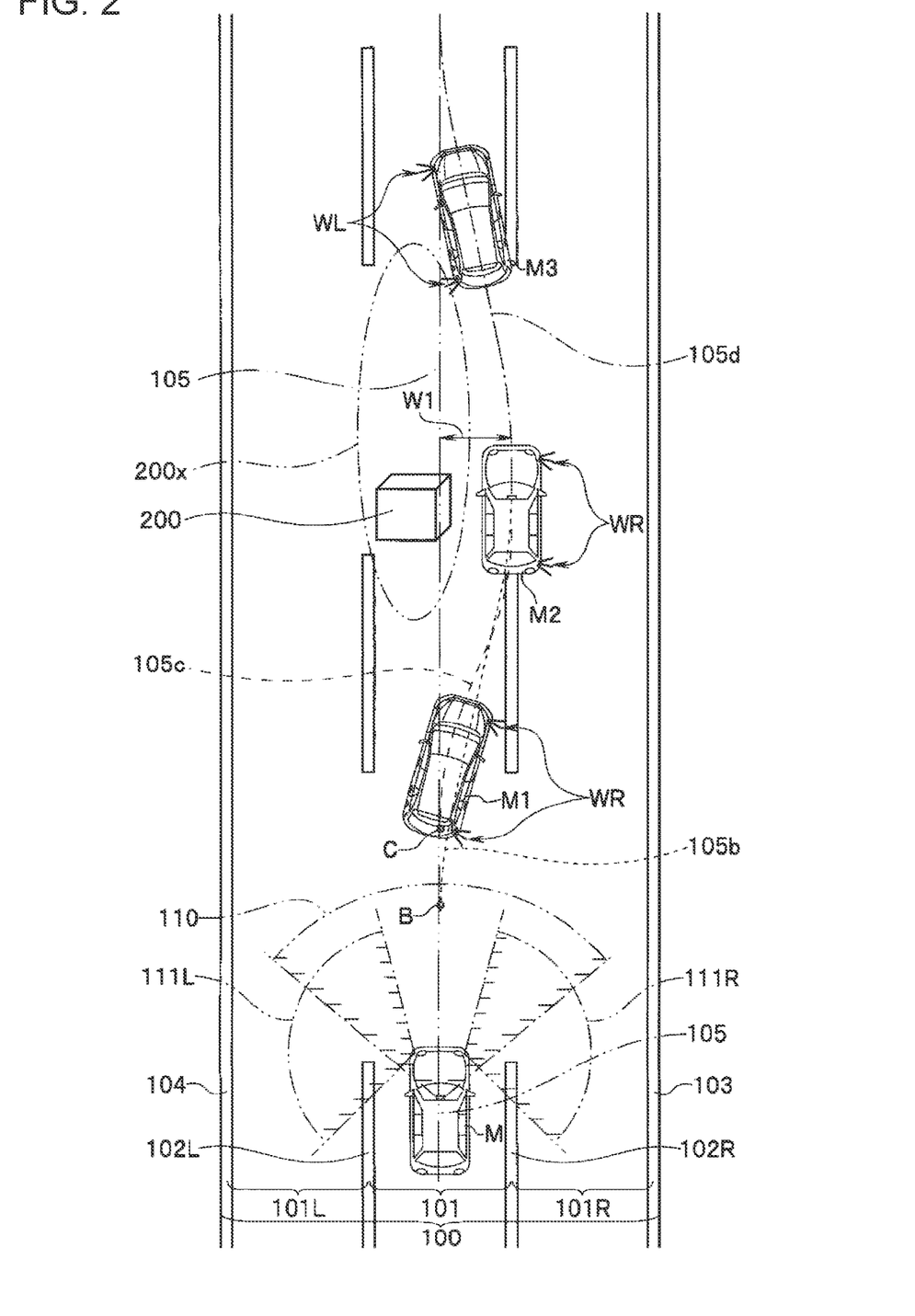
FIG. 2 is a conceptual diagram illustrating an example of a situation in which a vehicle including the drive assist apparatus according to the embodiment of the disclosure is traveling along a road in a drive assist mode.
Figure 3:
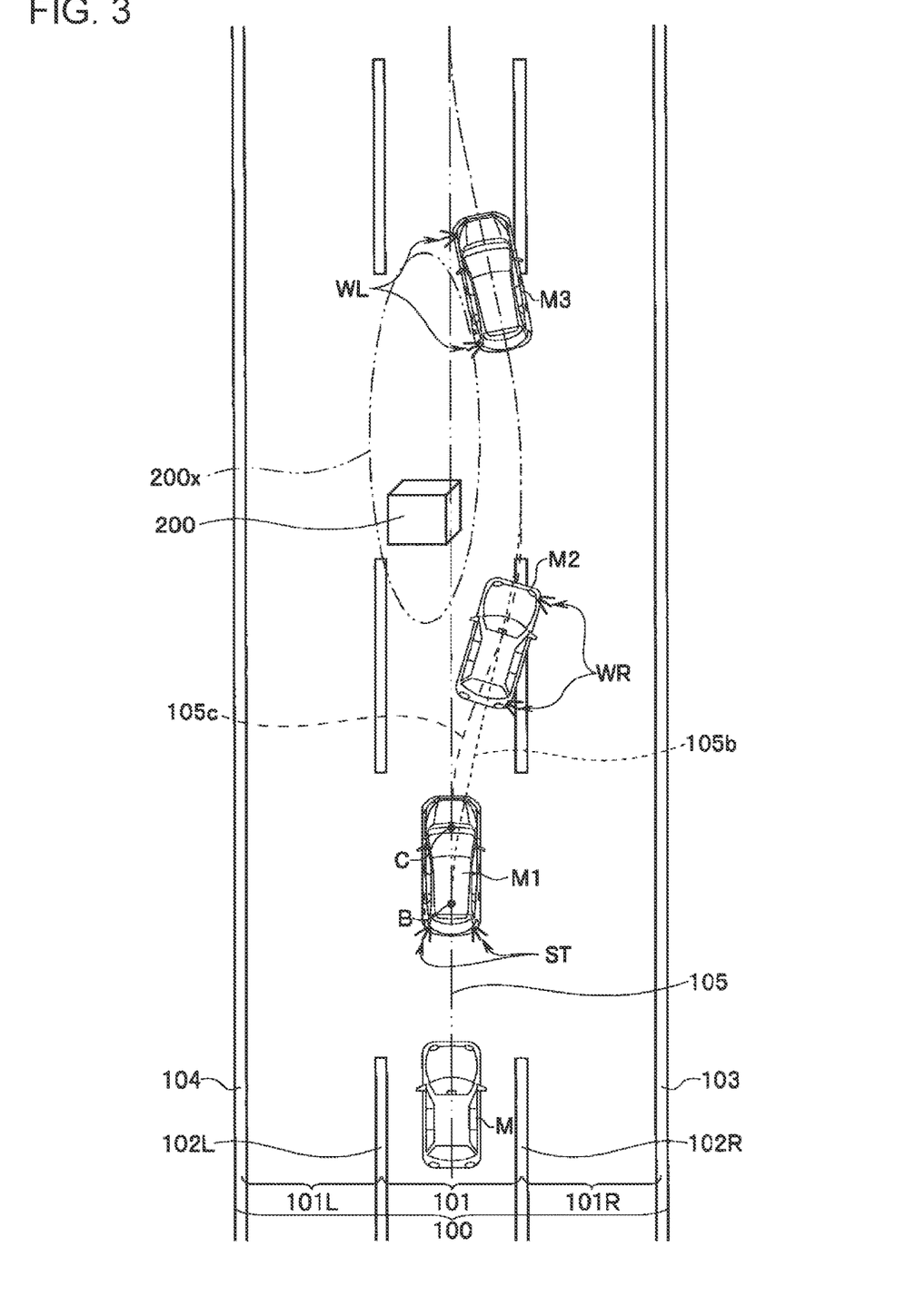
FIG. 3 is a conceptual diagram illustrating another example of the situation in which the vehicle including the drive assist apparatus according to the embodiment of the disclosure is traveling along the road in the drive assist mode.

For example, FIG. 2 and FIG. 3 are conceptual diagrams illustrating a situation in which the vehicle including the drive assist apparatus 1 of this embodiment is traveling along the road in the drive assist mode.

The situation of FIG. 2 is briefly described. In FIG. 2, reference symbol M represents the vehicle including the drive assist apparatus 1. As illustrated in FIG. 2, the vehicle M is traveling along a central lane of a road having three lanes on one side.

In FIG. 2, reference symbol 100 represents a traveling road where the vehicle M is traveling. In the traveling road 100, reference symbol 101 represents a vehicle traveling lane where the vehicle M is traveling. Reference symbol 101L represents a left lane adjoining the vehicle traveling lane 101 on the left side. Reference symbol 101R represents a right lane (so-called passing lane) adjoining the vehicle traveling lane 101 on the right side. Reference symbols 102R and 102L represent right and left lane lines of the vehicle traveling lane 101, respectively. Reference symbol 103 represents a right lane line of the right lane 101R. Reference symbol 104 represents a left lane line of the left lane 101L.

In FIG. 2, reference symbol 110 represents an imaging range (angle of view) of the stereo camera 11. Reference symbols 111R and 111L represent scanning ranges of the right front side sensor 37rf and the left front side sensor 37lf of the on-board radar devices 37, respectively.

In FIG. 2, reference symbol 105 (two-dot chain line) represents an imaginary line extending substantially through the center between the right and left lane lines 102R and 102L of the vehicle traveling lane 101. When the vehicle M travels along the vehicle traveling lane 101 under normal active lane keep centering (ALKC) control, traveling control is performed based on the central imaginary line 105.

As illustrated in FIG. 2, preceding vehicles are traveling ahead of the vehicle M. Reference symbol M1 represents a preceding vehicle traveling immediately ahead of the vehicle M (hereinafter referred to as "first preceding vehicle"). Reference symbol M2 represents a preceding vehicle traveling immediately ahead of the first preceding vehicle M1 (hereinafter referred to as "second preceding vehicle"). The second preceding vehicle M2 is the second closest preceding vehicle ahead of the vehicle M. Reference symbol M3 represents a preceding vehicle traveling immediately ahead of the second preceding vehicle M2 (hereinafter referred to as "third preceding vehicle"). The third preceding vehicle M3 is the third closest preceding vehicle ahead of the vehicle M.

In FIG. 2, reference symbol 200 represents a three-dimensional obstacle such as a fallen object. The obstacle 200 is an object that is present ahead of the vehicle M on a traveling route set in the vehicle traveling lane 101 of the vehicle M and may hinder the traveling of the vehicle M.

In the situation of FIG. 2, the obstacle 200 is present at a position where the surrounding environment recognition device (camera 11 and radars 37) of the drive assist apparatus 1 of the vehicle M cannot directly recognize the obstacle 200.

The position where the surrounding environment recognition device of the drive assist apparatus 1 of the vehicle M cannot directly recognize the obstacle 200 is assumed as follows. For example, the preceding vehicles (M1, M2, M3) are traveling ahead of the vehicle M. Although FIG. 2 illustrates the three preceding vehicles, any other preceding vehicle may further be present ahead.

For example, in a normal environment in which the vehicle M and the preceding vehicles (M1, M2, M3) are normally traveling along the same lane and no obstacle is present on the traveling lane, all the vehicles are traveling substantially in a row along the central imaginary line 105 while keeping predetermined distances therebetween.

It is assumed, in this normal situation, that the obstacle 200 is present ahead of a preceding vehicle traveling in advance of the vehicle M through intermediation of several preceding vehicles. In this case, the forward view of the vehicle M is obstructed by the preceding vehicles. Therefore, the drive assist apparatus 1 of the vehicle M cannot directly recognize the obstacle 200.

Among the preceding vehicles (M1, M2, M3), the preceding vehicles on the top side then recognize the obstacle 200. The preceding vehicles avoid collision with the obstacle 200 by traveling along traveling routes deviating from the normal traveling routes along the central imaginary line 105.

When the vehicle M is traveling along the road in the drive assist mode, the drive assist apparatus 1 of this embodiment presumes the presence or absence of the obstacle 200 ahead and its position and size (obstacle presence area) by recognizing the distribution of the behaviors of the preceding vehicles (M1, M2, M3) prior to the direct recognition of the obstacle 200.

When the presence of the obstacle 200 is presumed, a traveling route that can steer around the estimated presence area of the obstacle 200 is calculated and the obstacle avoidance control is started by using the traveling route as appropriate. Therefore, the drive assist apparatus 1 of this embodiment performs traveling control by using the traveling route that can avoid collision with the obstacle 200 prior to the direct recognition of the obstacle 200. Thus, the vehicle M can perform safe and reliable obstacle avoidance control.

The drive assist apparatus 1 of this embodiment mounted on the vehicle M determines whether the behaviors of the preceding vehicles are behaviors to avoid collision with the obstacle 200. This determination is made as follows. In the situation of FIG. 2, the preceding vehicles (M1, M2, M3) are traveling and the obstacle 200 is present ahead of the vehicle M traveling at the illustrated position (central lane 101 among the three lanes on one side). At this time, the obstacle 200 is hidden by the preceding vehicles (M1, M2, M3) and cannot directly be recognized by the vehicle M.

At this time, the first preceding vehicle M1 and the second preceding vehicle M2 are traveling along traveling routes deviating from the central imaginary line 105 of the vehicle traveling lane 101 while blinking their right turn signals WR. This situation can be recognized by the surrounding environment recognition device (for example, the stereo camera 11) of the drive assist apparatus 1 of the vehicle M. In this case, the drive assist apparatus 1 of the vehicle M can easily recognize the first preceding vehicle M1 because there is no obstacle between the vehicle M and the first preceding vehicle M1.

The second preceding vehicle M2 is traveling along a greatly deviating traveling route. In FIG. 2, reference symbol W1 represents a lateral position change amount (route deviation amount) of the second preceding vehicle M2 deviating rightward in the lateral direction from the central imaginary line 105.

In the normal case (traveling along the central imaginary line 105), the second preceding vehicle M2 may be hidden by the first preceding vehicle M1. In the situation of FIG. 2, the drive assist apparatus 1 of the vehicle M can recognize a part of the second preceding vehicle M2 over the first preceding vehicle M1 because of the large route deviation amount W1 of the second preceding vehicle M2 from the central imaginary line 105. The second preceding vehicle M2 is viewed from the vehicle M through intermediation of the first preceding vehicle M1. In this case, the vehicle M may recognize a part of the second preceding vehicle M2 through a rear windshield and a front windshield of the first preceding vehicle M1. The vehicle M may also recognize the shadow of the second preceding vehicle M2 on the road. Since the vehicle M recognizes at least a part of the second preceding vehicle M2, the presence of the second preceding vehicle M2 can be recognized.

The lateral position change amounts (route deviation amounts W1) of the preceding vehicles (M1, M2, etc.) can be estimated based on relative positional relationships between the vehicle M and the preceding vehicles (M1, M2, etc.). Thus, the behavior distribution (lateral position distribution) of the vehicles can be calculated. The preceding vehicles may be recognized by a known technology in any related-art drive assist apparatus.

The drive assist apparatus 1 of the vehicle M may also recognize the third preceding vehicle M3. In FIG. 2, the third preceding vehicle M3 is blinking left turn signals WL and is returning to the vehicle traveling lane 101 from a traveling route deviating from the central imaginary line 105 of the vehicle traveling lane 101. At this time, the drive assist apparatus 1 of the vehicle M may recognize a part of the left side of the third preceding vehicle M3.

Thus, when the drive assist apparatus 1 recognizes that at least two preceding vehicles (for example, M1, M2) out of the multiple preceding vehicles (M1, M2, M3) are blinking the turn signals and deviate from the traveling lanes by predetermined amounts, the drive assist apparatus 1 can presume that the behaviors of the two preceding vehicles (M1, M2) are the behaviors to avoid collision with the obstacle 200 ahead.

Based on the behavior of one preceding vehicle, it may be difficult to determine whether the preceding vehicle is avoiding collision with the obstacle 200 or is simply winding. When the behaviors of multiple (two or more) preceding vehicles are similar to each other, the drive assist apparatus 1 can presume a strong possibility of avoidance of collision with the obstacle 200. Thus, the presence of the obstacle 200 can be presumed more accurately by recognizing the behaviors of the preceding vehicles.

The drive assist apparatus 1 of the vehicle M estimates an estimated area 200x of the presence of the obstacle 200 based on the behavior distribution of at least two preceding vehicles (M1, M2) out of the multiple preceding vehicles (M1, M2, M3).

The situation of FIG. 2 is described in more detail. In FIG. 2, reference symbol 105b represents the deviating traveling route of the second preceding vehicle M2 (avoidance route; dotted line). Reference symbol B represents a timing when the second preceding vehicle M2 uses the deviating traveling route 105b. In FIG. 2, reference symbol 105c represents the deviating traveling route of the first preceding vehicle M1 (avoidance route; dashed line). Reference symbol C represents a timing when the first preceding vehicle M1 uses the deviating traveling route 105c.

The first preceding vehicle M1 at the position illustrated in FIG. 2 may directly recognize the obstacle 200. In the earlier situation (not illustrated), the first preceding vehicle M1 cannot directly recognize the obstacle 200 hidden by the second preceding vehicle M2. Therefore, the first preceding vehicle M1 may recognize the obstacle 200 for the first time after the second preceding vehicle M2 has used the deviating traveling route 105b. Through the related-art obstacle avoidance control, the first preceding vehicle M1 avoids collision with the obstacle 200 based on a result of recognition of the behavior of the second preceding vehicle M2 traveling immediately ahead or direct recognition of the obstacle 200.

The first preceding vehicle M1 may start to use the deviating traveling route 105c at the timing C later than the timing B when the second preceding vehicle M2 starts to use the deviating traveling route 105b. In this case, the first preceding vehicle M1 starts control at the later timing than the second preceding vehicle M2, and therefore tends to steer suddenly.

This situation is applied to the vehicle M and the first preceding vehicle M1. That is, in a case where the vehicle M uses a predetermined deviating traveling route after the behavior of the first preceding vehicle M1 has been recognized, the vehicle M starts the obstacle avoidance control at a later timing than the first preceding vehicle M1. In a case where the vehicle M uses the predetermined deviating traveling route after the obstacle 200 has directly been recognized, the vehicle M starts the obstacle avoidance control at an even later timing than the first preceding vehicle M1. In this case, the vehicle M may steer or brake suddenly with no time margin. The drive assist apparatus 1 of this embodiment allows the vehicle M to avoid such sudden behavior with no time margin.

FIG. 3 illustrates another situation regarding the determination as to whether the behaviors of the preceding vehicles are the behaviors to avoid collision with the obstacle 200. The situation of FIG. 3 is substantially similar to the situation of FIG. 2. In the situation of FIG. 3, the drive assist apparatus 1 of the vehicle M recognizes the surrounding environment as follows.

The drive assist apparatus 1 of the vehicle M recognizes that the second preceding vehicle M2 is traveling along the traveling route 105*b* (dotted line) deviating from the central imaginary line 105 of the vehicle traveling lane 101 while blinking its right turn signals WR. At this time, the drive assist apparatus 1 of the vehicle M recognizes that the first preceding vehicle M1 has lighted brake lamps. In FIG. 3, reference symbol ST represents the lighted brake lamps of the first preceding vehicle M1.

The drive assist apparatus 1 of this embodiment that recognizes this situation also presumes that the behaviors of the two preceding vehicles (M1, M2) are the behaviors to avoid collision with the obstacle 200. When the drive assist apparatus 1 recognizes that the brake lamps ST of several preceding vehicles (for example, the preceding vehicle immediately ahead of the vehicle M) are lighted as in the situation of FIG. 3, the drive assist apparatus 1 can presume a stronger possibility that the behavior of the preceding vehicle (first preceding vehicle M1 in FIG. 3) is the behavior to avoid collision with the obstacle 200.

Thus, it is possible to presume even more accurately that the behaviors of the preceding vehicles are the behaviors to avoid collision with the obstacle by recognizing the states of the turn signals (see FIG. 2) and the brake lamps (see FIG. 3) of the preceding vehicles as well as estimating the distribution of the lateral position change amounts (route deviation amounts W1) of the preceding vehicles.

In the situation of FIG. 3 as well, the drive assist apparatus 1 of the vehicle M may recognize the third preceding vehicle M3. As in the situation of FIG. 2, the drive assist apparatus 1 of the vehicle M may presume that the behavior of the third preceding vehicle M3 is the behavior to avoid collision with the obstacle 200.

The drive assist apparatus 1 of this embodiment recognizes the behaviors of the preceding vehicles, and determines whether the behaviors of the preceding vehicles are the behaviors to avoid collision with the obstacle. Although FIG. 2 and FIG. 3 illustrate the three preceding vehicles (M1, M2, M3), the drive assist apparatus 1 of this embodiment can determine (presume) whether the behaviors of at least two preceding vehicles (M1, M2) are the behaviors to avoid collision with the obstacle 200 as long as the behaviors of the at least two preceding vehicles (M1, M2) can be recognized.

FIG. 2 and FIG. 3 illustrate the examples in which the second preceding vehicle M2 is traveling over the right lane line 102R and the third preceding vehicle M3 is returning to the same lane as that of the vehicle M. The behaviors of the preceding vehicles are not limited to those in the examples. For example, whether the lane has deviated can be determined also in a case where the second preceding vehicle M2 or the third preceding vehicle M3 deviates from the same vehicle traveling lane 101 as that of the vehicle M and then changes the lane to the right lane 101R or the left lane 101L adjoining the vehicle traveling lane 101.

In the examples illustrated in FIG. 2 and FIG. 3, all the preceding vehicles (M1, M2, M3) deviate toward the right lane 101R, but the deviation is not limited to those in the illustrated examples. For example, in the case where the traveling road 100 of the vehicle M and the preceding vehicles (M1, M2, M3) has three lanes on one side and all the vehicles are traveling along the central lane 101 as illustrated in FIG. 2 and FIG. 3, whether the lane has deviated can be determined even if any preceding vehicle deviates toward the left lane 101L (including lane change to the left lane 101L).

In the examples illustrated in FIG. 2 and FIG. 3, the traveling road 100 of the vehicle M and the preceding vehicles (M1, M2, M3) has three lanes on one side, but is not limited thereto. For example, the two left lanes (101L, 101) in FIG. 2 and FIG. 3 may be assumed as the traveling roads of the vehicle M and the preceding vehicles (M1, M2, M3) and the right lane 101R in FIG. 2 and FIG. 3 may be assumed as an oncoming lane.

A flow of operations of the drive assist apparatus 1 of this embodiment is described with reference to a flowchart of FIG. 4. The following description is directed, for example, to the operations related to the obstacle avoidance control to be executed by the drive assist apparatus 1 of this embodiment, and description is omitted for general processes and operations to be executed in parallel in the drive assist apparatus 1.

The vehicle M including the drive assist apparatus 1 of this embodiment is traveling along the road illustrated in FIG. 2. At this time, the drive assist apparatus 1 of the vehicle M is set to the first traveling control mode (drive assist mode) or the second traveling control mode (autonomous driving mode). That is, the drive assist apparatus 1 of the vehicle M performs traveling control for the vehicle M while executing predetermined autonomous driving assist functions such as the adaptive cruise control (ACC), the active lane keep centering (ALKC) control, and the active lane keep bouncing (ALKB) control. In this case, the drive assist apparatus 1 may further execute the hands-off function (second traveling control mode).

Figure 4:
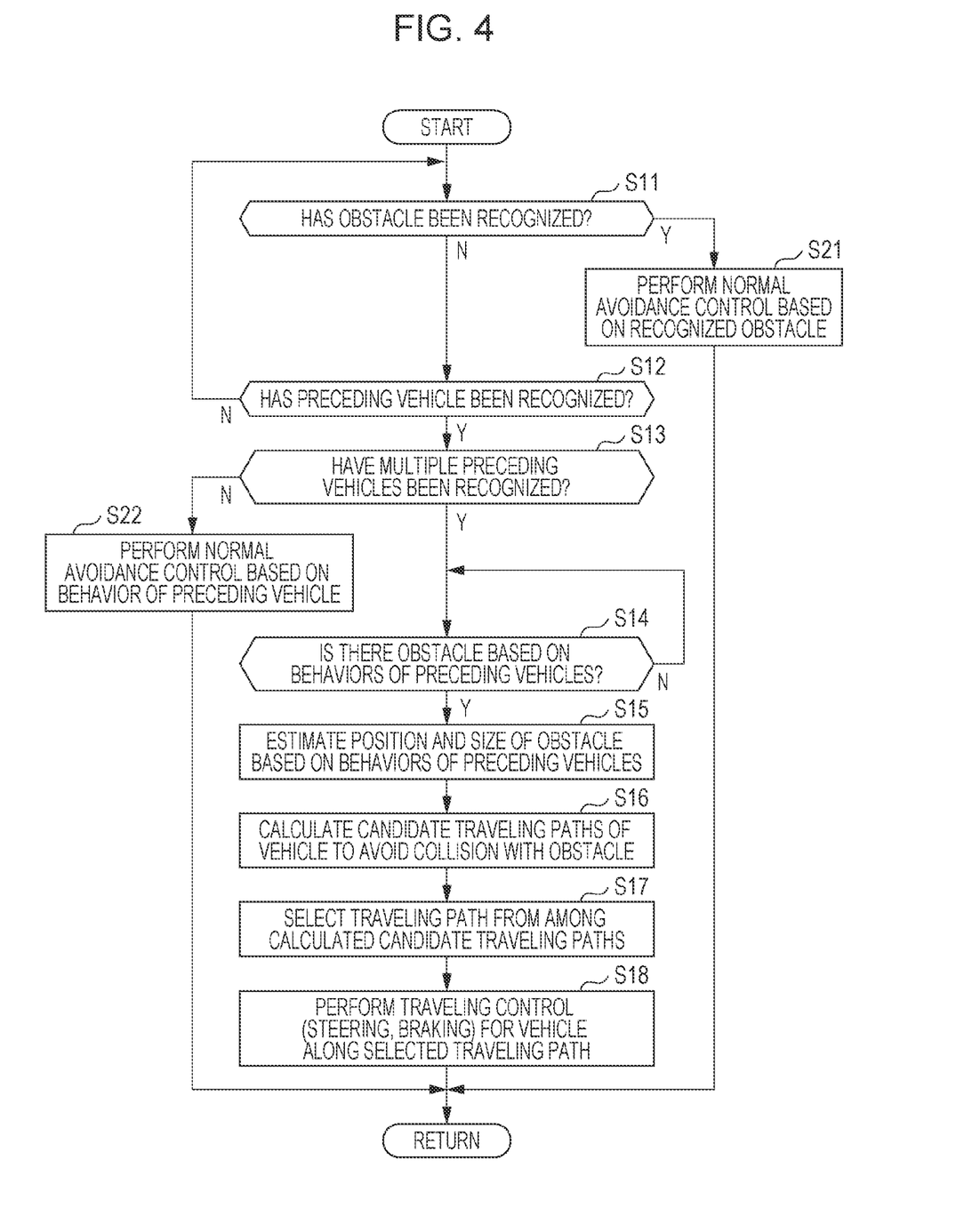
FIG. 4 is a flowchart illustrating a flow of operations of the drive assist apparatus according to the embodiment of the disclosure.

In Step S11 of FIG. 4, the drive assist apparatus 1 of the vehicle M under such a situation acquires surrounding environment information of the vehicle M by operating the surrounding environment recognition device (camera 11 and on-board radar devices 37). The drive assist apparatus 1 executes a predetermined process for the acquired surrounding environment information. Therefore, the drive assist apparatus 1 continuously recognizes situations in the surrounding environment (presence or absence of preceding vehicles or obstacles on the road).

In the process of Step S11, the drive assist apparatus 1 checks whether the presence of an obstacle has been recognized ahead. When the obstacle has been recognized, the process proceeds to Step S21. When no obstacle has been recognized, the process proceeds to Step S12.

When the process proceeds to Step S21 because the obstacle has been recognized, the drive assist apparatus 1 of the vehicle M has directly recognized the obstacle ahead of the vehicle M. In this case, the drive assist apparatus 1 executes related-art normal obstacle avoidance control based on the recognized obstacle. When the series of processes is finished, the process returns to the initial step (RETURN).

In Step S12, the drive assist apparatus 1 checks whether any preceding vehicle has been recognized based on the surrounding environment information acquired by the surrounding environment recognition device (camera 11 and on-board radar devices 37). When no preceding vehicle has been recognized, the process returns to Step S11. When any preceding vehicle has been recognized, the process proceeds to Step S13.

In Step S13, the drive assist apparatus 1 checks whether one preceding vehicle has been recognized or multiple preceding vehicles have been recognized in the process of Step S12. When one preceding vehicle has been recognized, the process proceeds to Step S22. When multiple preceding vehicles have been recognized, the process proceeds to Step S14.

When the process proceeds to Step S22 because one preceding vehicle has been recognized, the drive assist apparatus 1 executes normal obstacle avoidance control based on the behavior of the recognized preceding vehicle in Step S22. When the series of processes is finished, the process returns to the initial step (RETURN).

In Step S14, the drive assist apparatus 1 calculates the distribution of the behaviors of the recognized preceding vehicles, and presumes whether an obstacle that cannot be recognized by the vehicle is present ahead. In this case, the traveling control unit (traveling ECU) 14 of the drive assist apparatus 1 presumes the presence of the obstacle ahead based on the behavior distribution of the preceding vehicles recognized by the surrounding environment recognition device (camera 11 and on-board radar devices 37). In one embodiment, the traveling control unit (traveling ECU) 14 may serve as an "obstacle presumer".

To presume the presence or absence of the obstacle based on the behaviors of the preceding vehicles, relative positions between the vehicle and the recognized preceding vehicles are determined and lateral position change amounts (route deviation amounts) of the preceding vehicles are estimated as described with reference to FIG. 2 and FIG. 3. Thus, the lateral position distribution of the preceding vehicles is calculated. When the lateral position change amounts (route deviation amounts) of the preceding vehicles are equal to or larger than a predetermined threshold, the drive assist apparatus 1 presumes that the behaviors of the preceding vehicles are the behaviors to avoid collision with the obstacle. As described above, the behaviors of the preceding vehicles may differ from each other. When the drive assist apparatus 1 presumes that the behaviors of the preceding vehicles are the behaviors to avoid collision with the obstacle, the process proceeds to Step S15. In the process of Step S14, the predetermined threshold may be changed as appropriate if the drive assist apparatus 1 recognizes that turn signals are blinking or brake lamps are lighted.

In the process of Step S14, the drive assist apparatus 1 can presume that no obstacle is present ahead when the behavior distribution of the preceding vehicles falls below the threshold. In this case, the drive assist apparatus 1 repeats the process of Step S14 while continuing the normal adaptive cruise control (ACC), the normal active lane keep centering (ALKC) control, and the like.

In Step S15, the drive assist apparatus 1 estimates the presence area of the obstacle by estimating the position (the position relative to the vehicle or the position on the road) and the size of the presumed presence of the obstacle (obstacle presence area) based on the behaviors of the preceding vehicles. In this case, the traveling control unit (traveling ECU) 14 of the drive assist apparatus 1 estimates the position and size of the presence of the obstacle (obstacle presence area) when the presence of the obstacle is presumed. In one embodiment, the traveling control unit (traveling ECU) 14 may serve as an "obstacle presumer".

When the drive assist apparatus 1 presumes in the process of Step S14 that the behaviors of the preceding vehicles are the behaviors to avoid collision with the obstacle, the drive assist apparatus 1 can presume that the obstacle is present near the the preceding vehicles. Thus, the relative position between the vehicle and the obstacle can be estimated by calculating the positions of the vehicle and the preceding vehicles.

The size of the obstacle can be estimated also based on numerical data such as the width of the vehicle traveling lane, the widths of the vehicle and the preceding vehicles, and the lateral position change amounts (route deviation amounts) of the preceding vehicles. For example, the size of the obstacle can be estimated to increase as the lateral position change amounts (route deviation amounts) of the preceding vehicles increase.

The width of the vehicle traveling lane can be calculated by recognizing the right and left lane lines. The width of the vehicle can be determined by referring to, for example, vehicle information prestored in the drive assist apparatus 1 of the vehicle. The width of each preceding vehicle can be calculated based on image information from the stereo camera 11 or determined by referring to a predetermined fixed value (for example, an average passenger car width value) as an estimated value. The presence area of the obstacle can be estimated based on those pieces of estimated information.

In Step S16, the drive assist apparatus 1 calculates candidate traveling paths along which the vehicle may steer around the estimated presence area of the obstacle. In one embodiment, the traveling control unit (traveling ECU) 14 of the drive assist apparatus 1 may serve as a "traveling path calculator". One most appropriate traveling path may be presented instead of calculating multiple candidate traveling paths.

When the position and area of the obstacle are estimated in the process of Step S15, the distance from the vehicle to the obstacle and the period to reach the obstacle can be estimated based on the relative position between the obstacle and the vehicle and the speed of the vehicle. Thus, the timing to start the obstacle avoidance control by the vehicle can be set.

The candidate traveling path of the vehicle to avoid collision with the obstacle is calculated based on, for example, trajectories of the preceding vehicles, estimated values of the widths of the preceding vehicles (may be fixed values similarly to the above), the width of the vehicle, and a predetermined safety margin. In this case, the candidate traveling path is calculated as a traveling path area having a predetermined range in the lateral direction with respect to an expected traveling trajectory.

Figure 5:
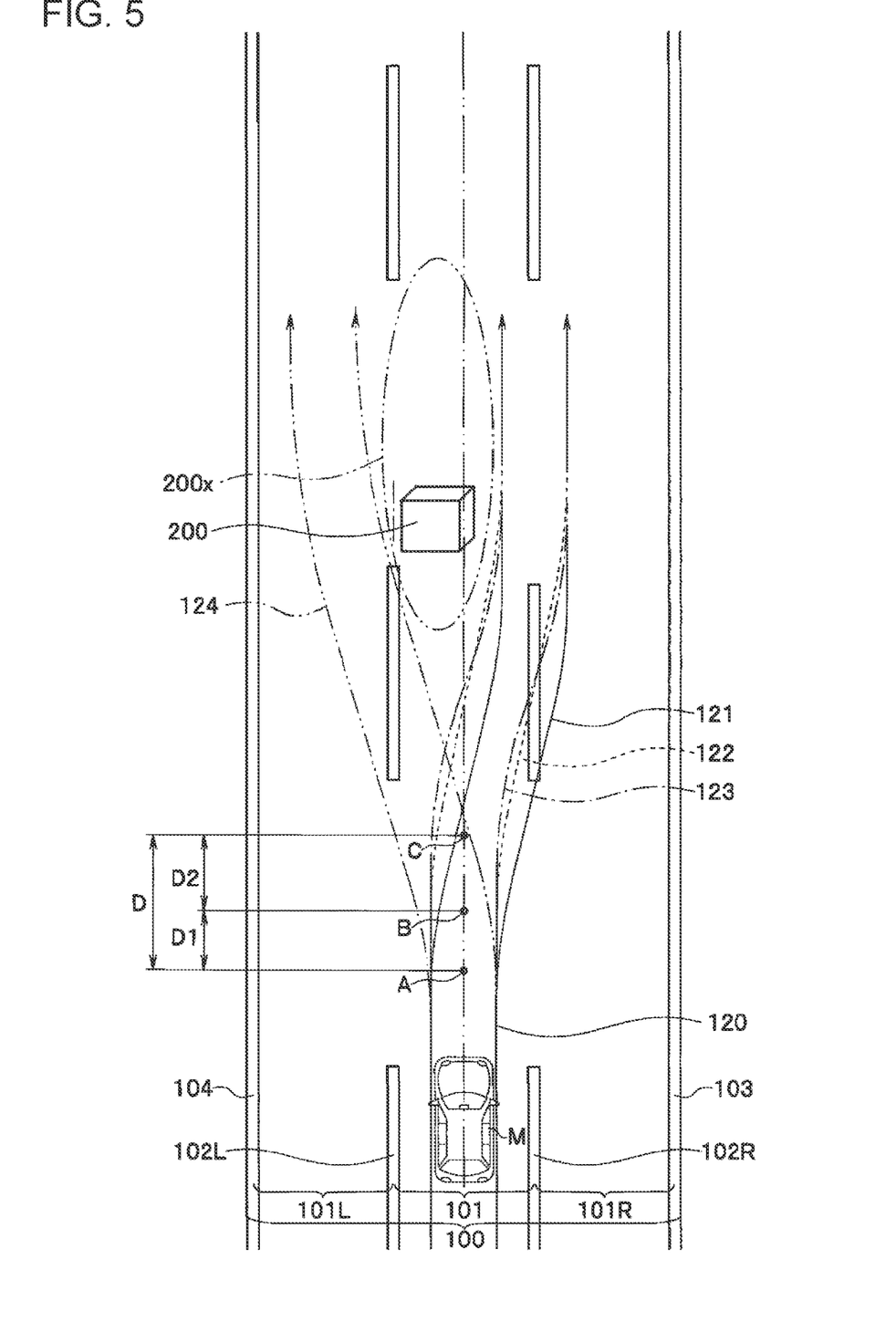
FIG. 5 is a conceptual diagram illustrating candidate traveling paths calculated in a process of Step S16 of FIG. 4.

FIG. 5 conceptually illustrates the candidate traveling paths calculated in the process of Step S16 of FIG. 4. In FIG. 5, reference symbol 120 (solid lines) represents a traveling path area when the vehicle M is traveling along the vehicle traveling lane 101. The traveling path area 120 is a traveling path area during the normal active lane keep centering (ALKC) control before the start of the obstacle avoidance control.

Reference symbol 121 (solid lines) represents a first candidate traveling path area among the candidate traveling paths calculated in the process of Step S16 of FIG. 4. The first candidate traveling path area 121 is calculated as a traveling path area in a case where the obstacle avoidance control can be performed prior to the direct recognition of the obstacle 200 by the vehicle M based on the estimated area 200x of the obstacle 200 estimated by recognizing the behavior distribution of the first preceding vehicle M1 and the second preceding vehicle M2 in FIG. 2. That is, the first candidate traveling path area 121 is calculated as a traveling path area in a case where the timing to start the obstacle avoidance control is set earlier than those of the first preceding vehicle M1 and the second preceding vehicle M2 in FIG. 2. Reference symbol A represents a control start point in a case where the obstacle avoidance control is performed on a deviating traveling route extending along the first candidate traveling path area 121.

Reference symbol 122 (broken lines) represents a second candidate traveling path area among the candidate traveling paths calculated in the process of Step S16 of FIG. 4. The second candidate traveling path area 122 substantially corresponds to the trajectory of the second preceding vehicle M2 in FIG. 2 (see the deviating traveling route 105*b* in FIG. 2). Reference symbol B represents a point where the obstacle avoidance control of the second preceding vehicle M2 is started.

Reference symbol 123 (chain lines) represents a third candidate traveling path area among the candidate traveling paths calculated in the process of Step S16 of FIG. 4. The third candidate traveling path area 123 substantially corresponds to the trajectory of the first preceding vehicle M1 in FIG. 2 (see the deviating traveling route 105*c* in FIG. 2). Reference symbol C represents a point where the obstacle avoidance control of the first preceding vehicle M1 is started.

Reference symbol 124 (two-dot chain lines) represents a fourth candidate traveling path area among the candidate traveling paths calculated in the process of Step S16 of FIG. 4. The fourth candidate traveling path area 124 substantially corresponds to a traveling route deviating toward the left lane 101L. A control start point in a case where the obstacle avoidance control is performed on a deviating traveling route extending along the fourth candidate traveling path area 124 substantially agrees with the point A.

The candidate traveling path areas (121, 122, 123, 124) branch continuously from the traveling path area 120. The candidate traveling path areas (121, 122, 123, 124) are calculated as traveling path areas to reliably steer around the estimated area 200*x* of the obstacle 200.

In Step S17, the drive assist apparatus 1 selects an appropriate traveling path area from among the candidate traveling paths calculated in the process of Step S16. In one embodiment, the traveling control unit (traveling ECU) 14 of the drive assist apparatus 1 may serve as "a traveling path selector". The selected appropriate traveling path is basically a traveling route deviating rightward.

In the example illustrated in FIG. 5, the recognized obstacle 200 is presumed to be present on a left side within the range of the vehicle traveling lane 101. To steer around the obstacle 200, it is appropriate that the vehicle M select the traveling route deviating rightward rather than the traveling route deviating leftward because the lateral position change amount is small. Thus, one of the rightward candidate traveling paths (121, 122, 123) is selected with priority in the example of FIG. 5.

As described above, the distance between the vehicle M and the obstacle 200 and the period to reach the obstacle 200 are estimated based on the relative position between the vehicle M and the obstacle 200 and the speed of the vehicle M. Then, a control start timing is set based on the information on the estimated distance or the estimated period to reach. For example, the three rightward candidate traveling paths (121, 122, 123) are listed as the first candidate traveling path area 121 (point A), the second candidate traveling path area 122 (point B), and the third candidate traveling path area 123 (point C) in descending order of the control start timings.

When the first candidate traveling path area 121 is selected in FIG. 5, the control start timing can be set to the earliest timing at the point A. When the second candidate traveling path area 122 is selected, the control start timing is a timing at the point B that is later than the timing at the point A by an amount represented by reference symbol D1 in FIG. 5. When the third candidate traveling path area 123 is selected, the control start timing is a timing at the point C that is later than the timing at the point A by an amount represented by reference symbol D in FIG. 5 and later than the timing at the point B by an amount represented by reference symbol D2 in FIG. 5. A traveling path at an appropriate control start timing is selected based on the estimated distance or the estimated period to reach. As the distance to the obstacle 200 or the period to reach the obstacle 200 increases, an earlier control start timing can be set with a time margin, thereby avoiding collision by gentle lateral movement.

When the traveling path is selected in the process of Step S17, the traveling control (obstacle avoidance control) is started in Step S18 to cause the vehicle to travel along the selected traveling path. For example, the obstacle avoidance control includes autonomous steering control and autonomous braking control.

When the obstacle avoidance control is started, the drive assist apparatus 1 checks the surrounding situation by using the surrounding environment recognition device (stereo camera 11 and on-board radar devices 37). When any other vehicle is traveling around, for example, behind or on the side of the vehicle M and the vehicle M uses a traveling route deviating toward the other vehicle, the vehicle M may hinder the traveling of the other vehicle. Therefore, when the vehicle M starts the obstacle avoidance control using the predetermined deviating traveling route, the surrounding safety is checked.

Figure 6:
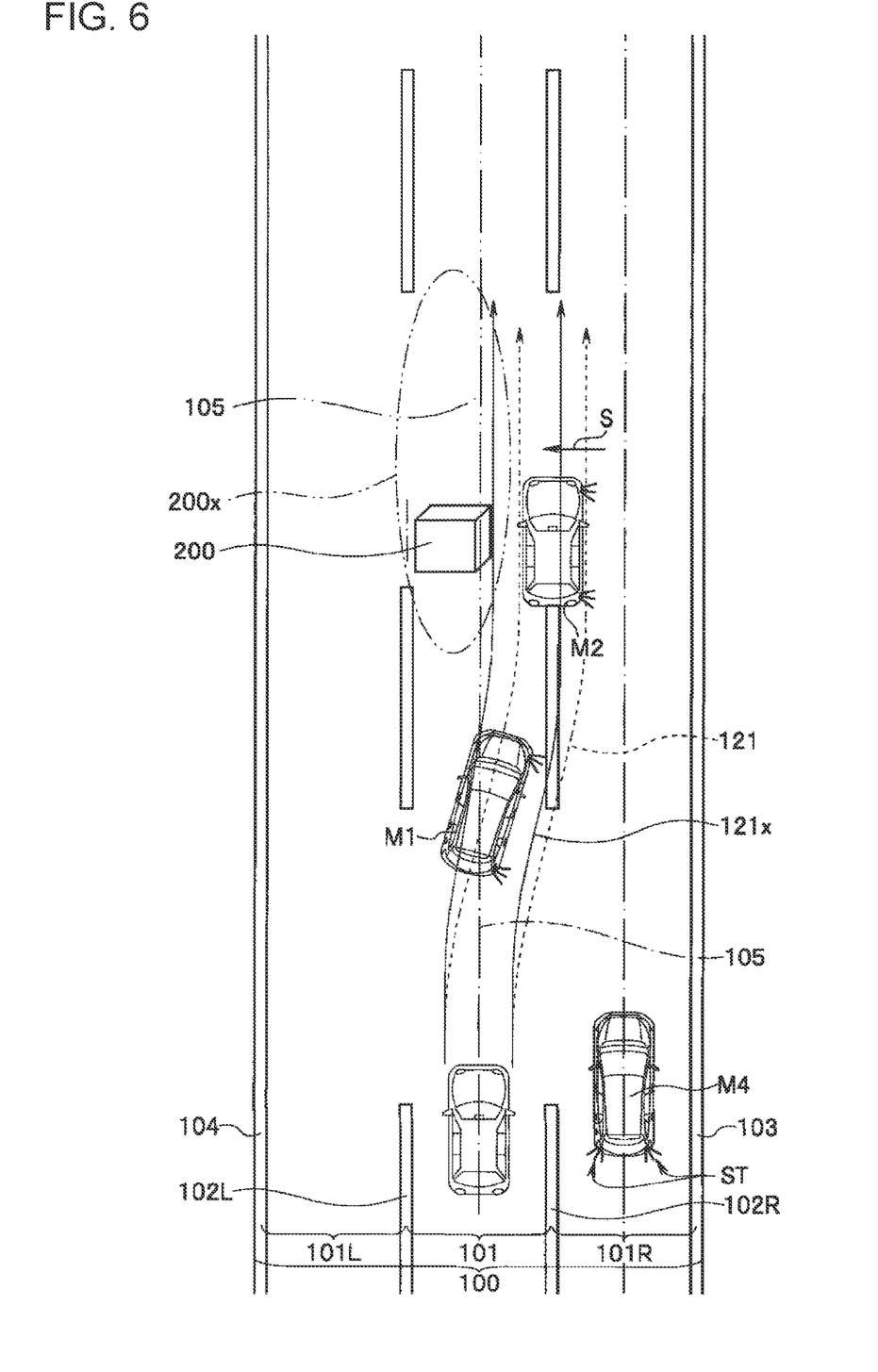
FIG. 6 is a conceptual diagram illustrating positional adjustment for a selected candidate traveling path area based on the surrounding environment during traveling control to be executed in a process of Step S18 of FIG. 4.

FIG. 6 shows an example of a situation in which other vehicles are present around the vehicle M when the first candidate traveling path area 121 is selected. As in the situation of FIG. 2, the vehicle M is traveling along the vehicle traveling lane 101 and the first preceding vehicle M1 and the second preceding vehicle M2 are steering around the obstacle 200 in the example of FIG. 6. At this time, the vehicle M presumes the presence of the obstacle 200 based on the behaviors of the first preceding vehicle M1 and the second preceding vehicle M2, and the first candidate traveling path area 121 thus calculated (see the area 121 represented by dotted lines in FIG. 6) is selected. In this situation, the drive assist apparatus 1 of the vehicle M is about to execute the traveling control by the obstacle avoidance control.

The drive assist apparatus 1 of the vehicle M recognizes another vehicle traveling behind or on the side of the vehicle M (hereinafter referred to as "other surrounding vehicle"; see reference symbol M4 in FIG. 6) in the right lane 101R adjoining the vehicle traveling lane 101.

In this case, the other surrounding vehicle M4 may decelerate (see the brake lamps ST) by recognizing the first preceding vehicle M1 and the second preceding vehicle M2 traveling along the deviating traveling routes.

When the vehicle M performs the traveling control along the selected first candidate traveling path area 121 in this situation, the vehicle M may hinder the traveling of the other surrounding vehicle M4.

In this situation, the drive assist apparatus 1 of the vehicle M performs positional adjustment for the selected first candidate traveling path area 121. In this case, the traveling control unit (traveling ECU) 14 of the drive assist apparatus 1 performs the positional adjustment for the selected traveling path area based on the surrounding environment around the vehicle M. In one embodiment, the traveling control unit (traveling ECU) 14 may serve as a "traveling path adjuster".

In the example illustrated in FIG. 6, the drive assist apparatus 1 of the vehicle M adjusts the lateral position of the selected first candidate traveling path area 121 by a predetermined amount in a direction indicated by an arrow S in FIG. 6 (toward the vehicle in the lateral direction), thereby setting a new candidate traveling path area 121x (solid lines). In the new candidate traveling path area 121x, the rightward lateral position change amount is reduced in consideration of the estimated area 200x of the obstacle 200. Thus, the vehicle M can suppress interference with the other surrounding vehicle M4 while avoiding collision with the obstacle 200.

In FIG. 6, the other surrounding vehicle M4 is the other vehicle traveling behind or on the side of the vehicle M in the adjacent lane, but is not limited to the vehicle in this example. For example, assuming that the right lane 101R in FIG. 6 is an oncoming lane, the other surrounding vehicle M4 may be an oncoming vehicle traveling from the forward side in the oncoming lane.

As described above, when any other surrounding vehicle (for example, a succeeding vehicle, a vehicle traveling side by side, or an oncoming vehicle on the adjacent lane) is recognized after the selection of the candidate traveling path area, the drive assist apparatus 1 of this embodiment performs the positional adjustment for the selected candidate traveling path area, thereby securing safer traveling of the vehicle M.

In the process of Step S18, the drive assist apparatus 1 avoids collision with the obstacle 200 by performing the obstacle avoidance control. In this process, the drive assist apparatus 1 of the vehicle M becomes able to directly recognize the presumed obstacle 200. That is, when the vehicle M approaches the obstacle 200, the drive assist apparatus 1 of the vehicle M becomes able to directly recognize the obstacle 200 that was hidden by the first preceding vehicle M1. In this situation, the drive assist apparatus 1 performs the normal traveling control for the directly recognized obstacle 200.

After the collision with the obstacle 200 is avoided, the vehicle M is returned to the original vehicle traveling lane 101. Then, the normal traveling control along the original vehicle traveling lane 101 is continued by the adaptive cruise control (ACC), the active lane keep centering (ALKC) control, and the like (RETURN).

According to the first embodiment described above, the behaviors of the preceding vehicles are recognized. Therefore, it is possible to accurately determine whether the preceding vehicles are avoiding collision with the obstacle or are simply winding.

When determination is made that the behaviors of the preceding vehicles are the behaviors to avoid collision with the obstacle, it is possible to presume the presence of the obstacle ahead based on the behavior distribution of the preceding vehicles even if the surrounding environment recognition device cannot directly recognize the obstacle.

When the presence of the obstacle is presumed ahead, the position and size (obstacle presence area) of the obstacle can be estimated based on the behavior distribution of the preceding vehicles.

When the presence of the obstacle is presumed ahead and the presence area of the obstacle is estimated, the traveling path areas to avoid collision with the presumed obstacle can be calculated. In this case, an appropriate traveling path for the obstacle avoidance control can be selected based on, for example, the relative position between the vehicle and the presumed obstacle. Thus, it is possible to start the obstacle avoidance control early and reliably at the timing prior to the preceding vehicles with a time margin.

When the behaviors of the preceding vehicles are the behaviors to avoid collision with the obstacle and the preceding vehicles are avoiding collision with the obstacle by, for example, sudden steering or braking, the vehicle can start an action to avoid collision with the obstacle at an earlier timing than the preceding vehicles with a time margin by recognizing the behaviors of the preceding vehicles.

In the embodiment described above, the recognized obstacle 200 is presumed to be present on the left side within the range of the vehicle traveling lane 101 as illustrated in FIG. 5. In the exemplified control process, one of the rightward candidate traveling paths (121, 122, 123) is selected with priority (Step S17 of FIG. 4).

In the embodiment described above, the vehicle M checks the surrounding situation after the selection of the rightward candidate traveling path (Step S17 of FIG. 4). When the presence of any other surrounding vehicle (see reference symbol M4 in FIG. 6) such as a succeeding vehicle or a vehicle traveling side by side is recognized on the right adjacent lane, the control process involving the lateral positional adjustment for the selected rightward candidate traveling path is performed in consideration of the other surrounding vehicle M4 (Step S18 of FIG. 4).

Figure 7:
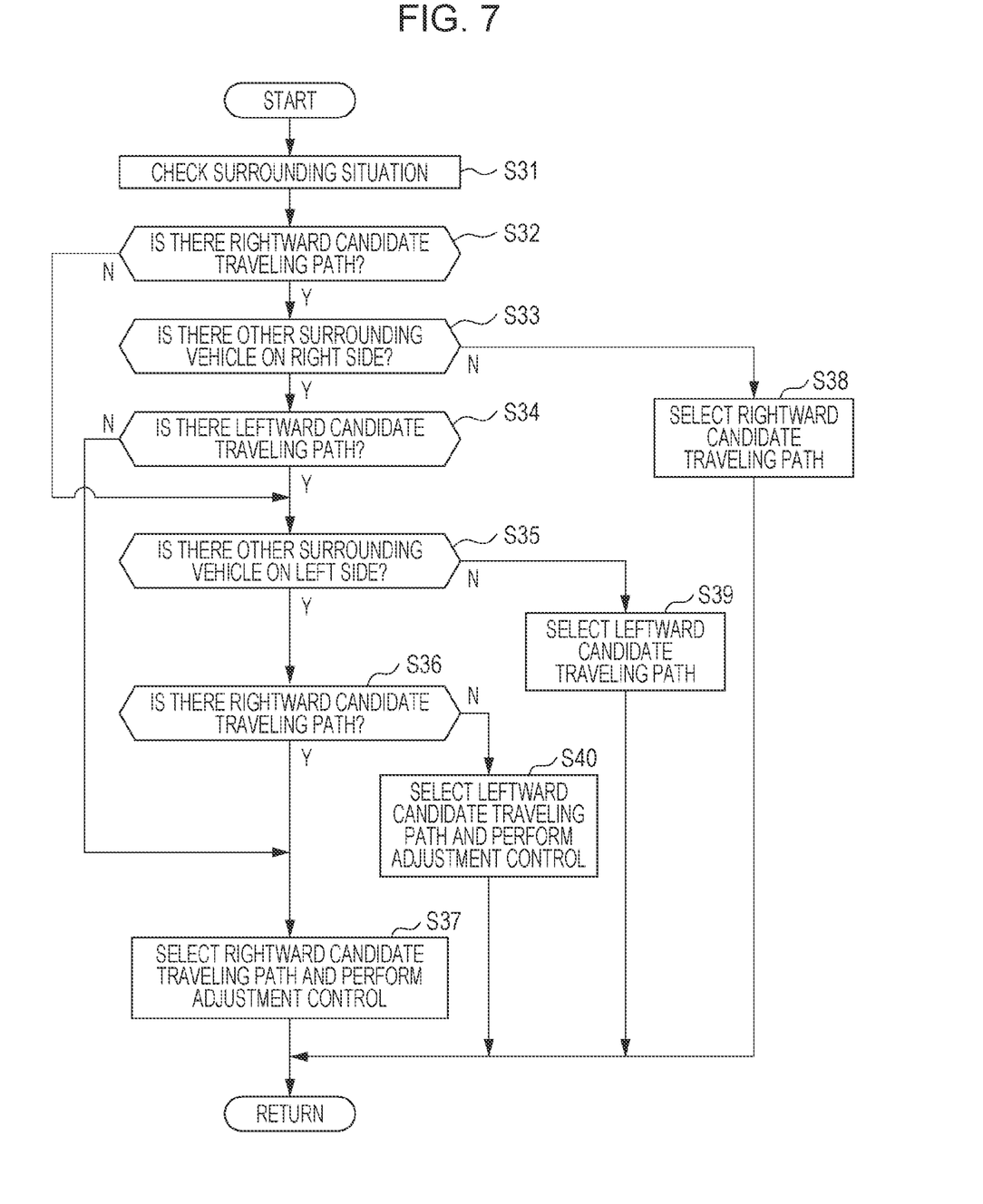
FIG. 7 is a flowchart illustrating a subroutine according to a modified example of a candidate traveling path selection process according to the embodiment of the disclosure (process of Step S17 of FIG. 4).

When any other appropriate candidate traveling path is present without the lateral positional adjustment, a control process for selecting that candidate traveling path may be performed even if the lateral position change amount is large. Therefore, the following control process may be provided in the process of Step S17 of FIG. 4 (candidate traveling path illustrating a selection process). FIG. 7 is a flowchart subroutine according to a modified example of the candidate traveling path selection process (process of Step S17 of FIG. 4) in the embodiment described above.

In this modified example, the drive assist apparatus 1 checks the surrounding situation by using the surrounding environment recognition device (stereo camera 11 and on-board radar devices 37) in a process of Step S31 of FIG. 7.

In Step S32, the drive assist apparatus 1 checks whether the candidate traveling paths calculated in the process of Step S16 (see FIG. 4) include a rightward candidate traveling path. When there is a rightward candidate traveling path, the process proceeds to Step S33. When there is no rightward candidate traveling path, the process proceeds to Step S35.

In Step S33, the drive assist apparatus 1 checks whether any other surrounding vehicle is present on the right adjacent lane of the vehicle M based on a result of the process of Step S31. When the presence of any other surrounding vehicle is recognized on the right side, the process proceeds to Step S34. When the presence of any other surrounding vehicle is not recognized on the right side, the process proceeds to Step S38.

In Step S34, the drive assist apparatus 1 checks whether the candidate traveling paths calculated in the process of Step S16 (see FIG. 4) include a leftward candidate traveling path. When there is a leftward candidate traveling path, the process proceeds to Step S35. When there is no leftward candidate traveling path, the process proceeds to Step S37.

In Step S35, the drive assist apparatus 1 checks whether any other surrounding vehicle is present on the left adjacent lane of the vehicle M based on the result of the process of Step S31. When the presence of any other surrounding vehicle is recognized on the left side, the process proceeds to Step S36. When the presence of any other surrounding vehicle is not recognized on the left side, the process proceeds to Step S39.

In Step S36, the drive assist apparatus 1 checks whether the candidate traveling paths calculated in the process of Step S16 (see FIG. 4) include a rightward candidate traveling path. Although the same check is made in the process of Step S32, the check is made again because the processing flow proceeds to Step S36 both when the candidate is present on the right side and when no candidate is present on the right side in the process of Step S32. When there is a rightward candidate traveling path, the process proceeds to Step S37. When there is no rightward candidate traveling path, the process proceeds to Step S40.

In Step S37, the drive assist apparatus 1 selects the rightward candidate traveling path, and an adjustment process is performed for the selected candidate traveling path. This adjustment process is the same as the process described in FIG. 6 and in Step S18 of FIG. 4 in the embodiment described above. Then, the series of processes is finished, and the process returns to the initial step (RETURN).

In Step S38, the drive assist apparatus 1 selects the rightward candidate traveling path. Then, the series of processes is finished, and the process returns to the initial step (RETURN). The process in this case is the same as the process of selecting the rightward candidate traveling path with priority as in Step S17 of FIG. 4 in the embodiment described above.

In Step S39, the drive assist apparatus 1 selects the leftward candidate traveling path. Then, the series of processes is finished, and the process returns to the initial step (RETURN).

In Step S40, the drive assist apparatus 1 selects the leftward candidate traveling path, and an adjustment process is performed for the selected candidate traveling path. This adjustment process is substantially the same as the process of Step S37 (process described in FIG. 6 and in Step S18 of FIG. 4 in the embodiment described above). In this case, the process is performed by switching "right" to "left". Then, the series of processes is finished, and the process returns to the initial step (RETURN).

Through the control process according to the modified example, it is possible to attain substantially the same effects as those in the embodiment described above. In this modified example, the situation involving the other surrounding vehicle is checked and the candidate traveling path is selected based on the recognized situation involving the other surrounding vehicle. Thus, safer and easier control can be selected.

In the drive assist apparatus 1 of this embodiment, the stereo camera 11 of the camera unit 10 acquires the image data showing the surrounding environment during the traveling of the vehicle, but the disclosure is not limited to this example. For example, a monocular camera may serve as a "surrounding environment recognition device" in place of the stereo camera 11. The on-board radar devices 37 recognize the surrounding environment around the vehicle, but the disclosure is not limited to this example. For example, a light detection and ranging (LiDAR) sensor may serve as a "surrounding environment recognition device" in place of the on-board radar devices 37.

The embodiment of the disclosure is not limited to the embodiment described above, and various modifications and applications may be made without departing from the gist of the disclosure. The embodiment includes various aspects of the disclosure that may be extracted by any appropriate combination of the disclosed constituent elements. For example, some of the constituent elements in the embodiment may be omitted as long as the problems described above can be solved and the effects described above can be attained. The constituent elements of different embodiments may be combined as appropriate. The embodiment of the disclosure is limited to the appended claims but not limited to specific modes of implementation.

According to the embodiment of the disclosure, it is possible to provide the vehicle drive assist apparatus that can start more accurate obstacle avoidance control at an earlier timing when an obstacle that may hinder the traveling of the vehicle is present on its traveling path.

The traveling ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle drive assist apparatus to be applied to a vehicle, the vehicle drive assist apparatus being configured to execute at least lane keeping traveling control for causing the vehicle to travel along a traveling lane and obstacle avoidance control for setting a traveling route to avoid collision of the vehicle with an obstacle on a road and causing the vehicle to travel along the traveling route, the vehicle drive assist apparatus comprising:

a surrounding environment recognition device configured to recognize a surrounding environment around the vehicle; and a traveling control unit configured to:
 recognize two or more preceding vehicles, recognized by the surrounding environment recognition device, traveling on a same road as the vehicle,
 determine deviations of the two or more preceding vehicles from a center line of the road, based on the surrounding environment recognized by the surrounding environment recognition device;
 determine whether the deviations of the two or more vehicles are equal to or greater than a threshold;
 based on determining that the two or more preceding vehicles have deviations equal to or greater than the threshold, presume presence of an obstacle ahead of the vehicle;
 estimate a position and an area where the obstacle is present when the presence of the obstacle is presumed;
 calculate candidates for traveling path areas along which the vehicle is expected to travel while avoiding collision with the presumed obstacle;
 select a traveling path area from among the calculated traveling path areas and set the selected traveling path area; and control the vehicle to travel along the selected traveling path area.

2. The vehicle drive assist apparatus according to claim 1, wherein the traveling control unit further comprises a traveling path adjuster configured to perform positional adjustment for the selected traveling path area based on the surrounding environment around the vehicle.

3. The vehicle drive assist apparatus according to claim 1, wherein the surrounding environment recognition device comprises:
    an on-board camera device configured to recognize the surrounding environment around the vehicle by acquiring image data on surroundings of the vehicle; and
    an on-board radar device configured to recognize the surrounding environment around the vehicle by outputting radio waves to the surroundings of the vehicle, receiving the radio waves reflected from objects, and analyzing the received radio waves.

4. The vehicle drive assist apparatus according to claim 2, wherein the surrounding environment recognition device comprises:
    an on-board camera device configured to recognize the surrounding environment around the vehicle by acquiring image data on surroundings of the vehicle; and
    an on-board radar device configured to recognize the surrounding environment around the vehicle by outputting radio waves to the surroundings of the vehicle, receiving the radio waves reflected from objects, and analyzing the received radio waves.

5. A vehicle drive assist apparatus to be applied to a vehicle, the vehicle drive assist apparatus being configured to execute at least lane keeping traveling control for causing the vehicle to travel along a traveling lane and obstacle avoidance control for setting a traveling route to avoid collision of the vehicle with an obstacle on a road and causing the vehicle to travel along the traveling route, the vehicle drive assist apparatus comprising:
    circuitry configured to
        recognize a surrounding environment around the vehicle;
        recognize two or more preceding vehicles traveling on a same road as the vehicle, based on the recognized surrounding environment;
        determine deviations of the two or more preceding vehicles from a center line of the road, based on the recognized surrounding environment;
        determine whether the deviations of the two or more vehicles are equal to or greater than a threshold;
        based on determining that the two or more preceding vehicles have deviations equal to or greater than the threshold, presume presence of an obstacle ahead of the vehicle;
        estimate a position and an area where the obstacle is present in a case where the presence of the obstacle is presumed;
        calculate candidates for traveling path areas along which the vehicle is expected to travel while avoiding collision with the presumed obstacle;
        select a traveling path area from among the calculated traveling path areas and set the selected traveling path area; and
        control the vehicle to travel along the selected traveling path area.

6. The vehicle drive assist apparatus according to claim 1, wherein the two or more preceding vehicles travel in the same traveling lane as the vehicle.

7. The vehicle drive assist apparatus according to claim 5, wherein the two or more preceding vehicles travel in the same traveling lane as the vehicle.

* * * * *